(12) United States Patent
Bang et al.

(10) Patent No.: US 11,256,130 B2
(45) Date of Patent: Feb. 22, 2022

(54) DISPLAY DEVICE

(71) Applicant: Samsung Display Co., LTD., Yongin-si (KR)

(72) Inventors: Jong Uk Bang, Yongin-si (KR); Jang Sik Park, Yongin-si (KR); Joo Young Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/850,744

(22) Filed: Apr. 16, 2020

(65) Prior Publication Data

US 2021/0048710 A1 Feb. 18, 2021

(30) Foreign Application Priority Data

Aug. 16, 2019 (KR) .................. 10-2019-0100491

(51) Int. Cl.
| | | |
|---|---|---|
| *G02F 1/1335* | (2006.01) | |
| *G02F 1/017* | (2006.01) | |
| *F21V 8/00* | (2006.01) | |
| *G02F 1/1362* | (2006.01) | |

(52) U.S. Cl.
CPC ..... *G02F 1/133553* (2013.01); *G02B 6/0025* (2013.01); *G02B 6/0055* (2013.01); *G02F 1/017* (2013.01); *G02F 1/133514* (2013.01); *G02F 1/136286* (2013.01); *G02F 1/01791* (2021.01)

(58) Field of Classification Search
CPC ........ G02F 1/133553; G02F 1/133555; G02F 1/133524; G02F 1/133514; G02F 1/1347; G02F 2001/133618; G02B 6/0055; G02B 6/003; G02B 6/002; G02B 6/0031; G02B 6/0066; G02B 6/0091; G02B 19/00; G02B 19/0039; F21K 9/64; H01L 33/50; H01L 33/502; H01L 27/32; H01L 27/3225; H01L 27/3232; F21V 5/048; G09G 2300/023

See application file for complete search history.

(56) References Cited

U.S. PATENT DOCUMENTS

| | | | |
|---|---|---|---|
| 6,369,866 B1* | 4/2002 | Rai ................ | G02B 6/003 |
| | | | 349/61 |
| 8,979,294 B2 | 3/2015 | An et al. | |
| 2017/0371187 A1* | 12/2017 | Yamazaki ........... | H01L 27/3267 |
| 2018/0120638 A1* | 5/2018 | Tseng .................. | G02B 6/005 |
| 2018/0202616 A1* | 7/2018 | Yoon ................... | F21V 9/40 |
| 2018/0372930 A1 | 12/2018 | Park et al. | |

FOREIGN PATENT DOCUMENTS

| | | |
|---|---|---|
| JP | 2012-069256 | 4/2012 |
| KR | 10-1907165 | 10/2018 |
| KR | 10-2019-0000964 | 1/2019 |

* cited by examiner

*Primary Examiner* — Angela K Davison
(74) *Attorney, Agent, or Firm* — Kile Park Reed & Houtteman PLLC

(57) ABSTRACT

A display device includes a first display panel including a light emitting element; a light condensing element at a side portion of the first display panel; a light guide plate below the first display panel; The light condensing element transmits external light to the light guide plate.

20 Claims, 13 Drawing Sheets

DISPLAY DEVICE

CROSS-REFERENCE TO RELATED APPLICATION(S)

This application claims priority to and benefits of Korean patent application No. 10-2019-0100491 under 35 U.S.C. § 119, filed in the Korean Intellectual Property Office on Aug. 16, 2019, the entire contents of which are incorporated herein by reference.

BACKGROUND

1. Technical Field

The disclosure generally relates to a display device.

2. Description of the Related Art

The importance of display devices is constantly increasing because of the development of multimedia. Accordingly, various display devices such as a liquid crystal display device (LCD) and an organic light emitting display device (OLED) have been developed.

A type of display device has a function of adjusting the luminance of the display device according to an external illuminance environment by having an illuminance sensor mounted therein. Adjusting the luminance may be based on user visibility according to the external illuminance environment. The display device increases the luminance when external illuminance is high, and decreases the luminance when the external illuminance is low.

When external illuminance is high, an organic light emitting display device increases display luminance by increasing the driving current of a display panel to improve visibility. Accordingly, current consumption of the display device may be increased, and battery use time of the display device may be reduced due to the increased current consumption.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide a display device capable of increasing display luminance of the display device by using external light, without increasing current consumption.

In accordance with an aspect of the disclosure, there is provided a display device that may include: a first display panel including a light emitting element; a light condensing element disposed at a side portion of the first display panel; a light guide plate disposed below the first display panel; wherein the light condensing element transmits external light to the light guide plate.

The display device may further include a second display panel disposed between the first display panel and the light guide plate, the second display panel including a liquid crystal layer.

The display device may further include a reflective plate disposed below the light guide plate.

The reflective plate may include a flat part and a protrusion part extending from the flat part. The protrusion part may be disposed to overlap the light condensing element.

The protrusion part may receive the external light transmitted from the light condensing element, and reflect the external light toward the light guide plate.

The flat part and the protrusion part may be integrally formed.

The light guide plate may include an inclined surface formed between a lower surface of the light guide plate and a side surface of the light guide plate. The inclined surface of the light guide plate may correspond to the protrusion part extending from the flat part of the reflective plate.

The first display panel may include a data line electrically connected to the light emitting element. The light transmittance of the second display panel may be changed corresponding to an electric field formed between the data line and the reflective plate.

The display device may further include a diffusion plate disposed between the second display panel and the light guide plate.

The display device may further include a color conversion layer disposed to overlap the first display panel and the second display panel. The color conversion layer may include a color filter.

The color conversion layer may be disposed between the first display panel and the second display panel.

The first display panel may include at least one of a red light emitting element emitting red light, a green light emitting element emitting green light, and a blue light emitting element emitting blue light.

The color conversion layer may be disposed above the first display panel.

The first display panel may include at least one of a red light emitting element emitting red light, a green light emitting element emitting green light, a blue light emitting element emitting blue light, and a white light emitting element emitting white light.

The color conversion layer may further include a wavelength conversion member disposed between the first display panel and the color filter. The wavelength conversion member may include quantum dots and scattering particles.

The first display panel may include a blue light emitting element emitting blue light.

In accordance with an aspect of the disclosure, there is provided a display device that may include: a display panel; a light condensing element disposed at a side portion of the liquid crystal display panel; a light guide plate disposed below the liquid crystal display panel; and a light source disposed adjacent to a side of the light guide plate, wherein the light condensing element transmits external light to the light guide plate.

The display panel may be a liquid crystal display panel including a liquid crystal layer.

The display device may further include a reflective plate disposed below the light guide plate.

The display device may further include a color conversion layer disposed above the liquid crystal display panel. The color conversion layer may include a color filter.

DETAILED DESCRIPTION OF THE EMBODIMENTS

Figure 1:
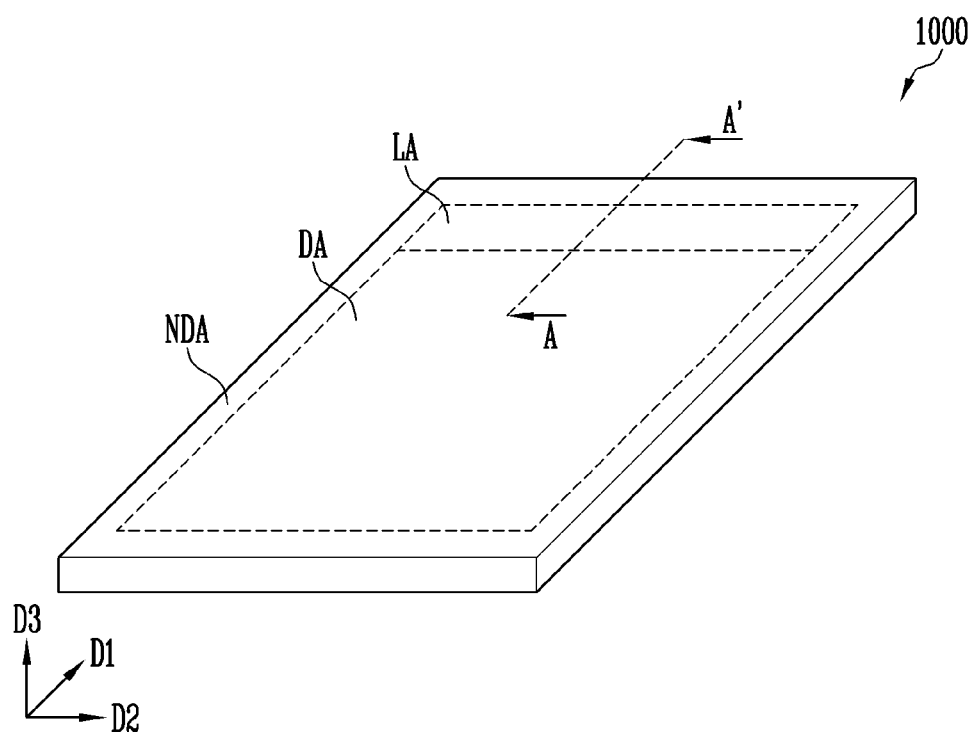
FIG. 1 is a schematic perspective view of a display device in accordance with an embodiment.

The effects and characteristics of the disclosure and a method of achieving the effects and characteristics will be clear by referring to embodiments described below in detail together with the accompanying drawings. However, the disclosure is not limited to the embodiments disclosed herein but may be implemented in various forms. The embodiments are provided by way of example only so that a person of ordinary skilled in the art can fully understand the disclosure and the scope thereof. The specification should thus be construed as including all the changes, equivalents and substitutions included in the spirit and scope of the disclosure.

Some of the parts which are not associated with the description may not be provided in order to describe embodiments of the disclosure and like reference numerals refer to like elements throughout the specification.

In the drawings, sizes and thicknesses of elements may be enlarged for better understanding, clarity, and ease of description thereof. However, the disclosure is not limited to the illustrated sizes and thicknesses. In the drawings, the thicknesses of layers, films, panels, regions, and other elements, may be exaggerated for clarity. In the drawings, for better understanding and ease of description, the thicknesses of some layers and areas may be exaggerated.

Further, in the specification, the phrase "in a plan view" means when an object portion is viewed from above, and the phrase "in a schematic cross-sectional view" means when a schematic cross-section taken by vertically cutting an object portion is viewed from the side.

Additionally, the terms "overlap" or "overlapped" mean that a first object may be above or below or to a side of a second object, and vice versa. Additionally, the term "overlap" may include layer, stack, face or facing, extending over, covering or partly covering or any other suitable term as would be appreciated and understood by those of ordinary skill in the art. The terms "face" and "facing" mean that a first element may directly or indirectly oppose a second element. In a case in which a third element intervenes between the first and second element, the first and second element may be understood as being indirectly opposed to one another, although still facing each other. When an element is described as 'not overlapping' or 'to not overlap' another element, this may include that the elements are spaced apart from each other, offset from each other, or set aside from each other or any other suitable term as would be appreciated and understood by those of ordinary skill in the art.

When a layer, film, region, substrate, or area, is referred to as being "on" another layer, film, region, substrate, or area, it may be directly on the other film, region, substrate, or area, or intervening films, regions, substrates, or areas, may be present therebetween. Conversely, when a layer, film, region, substrate, or area, is referred to as being "directly on" another layer, film, region, substrate, or area, intervening layers, films, regions, substrates, or areas, may be absent therebetween. Further when a layer, film, region, substrate, or area, is referred to as being "below" another layer, film, region, substrate, or area, it may be directly below the other layer, film, region, substrate, or area, or intervening layers, films, regions, substrates, or areas, may be present therebetween. Conversely, when a layer, film, region, substrate, or area, is referred to as being "directly below" another layer, film, region, substrate, or area, intervening layers, films, regions, substrates, or areas, may be absent therebetween. Further, "over" or "on" may include positioning on or below an object and does not necessarily imply a direction based upon gravity.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

Throughout the specification, when an element is referred to as being "connected" to another element, the element may be "directly connected" to another element, or "electrically connected" to another element with one or more intervening elements interposed therebetween. It will be further understood that when the terms "comprises," "comprising," "includes" and/or "including" are used in this specification, they or it may specify the presence of stated features, integers, steps, operations, elements and/or components, but do not preclude the presence or addition of other features, integers, steps, operations, elements, components, and/or any combination thereof.

Although the terms "first," "second," and the like are used for describing various components, these components are not confined by these terms. These terms are merely used for distinguishing one component from the other components. Therefore, a first component may be a second component or vice versa within the spirit and scope of the disclosure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 5% of the stated value.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms used herein (including technical and scientific terms) have the same meaning as commonly understood by those skilled in the art to which this disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described with reference to the accompanying drawings.

Figure 2:
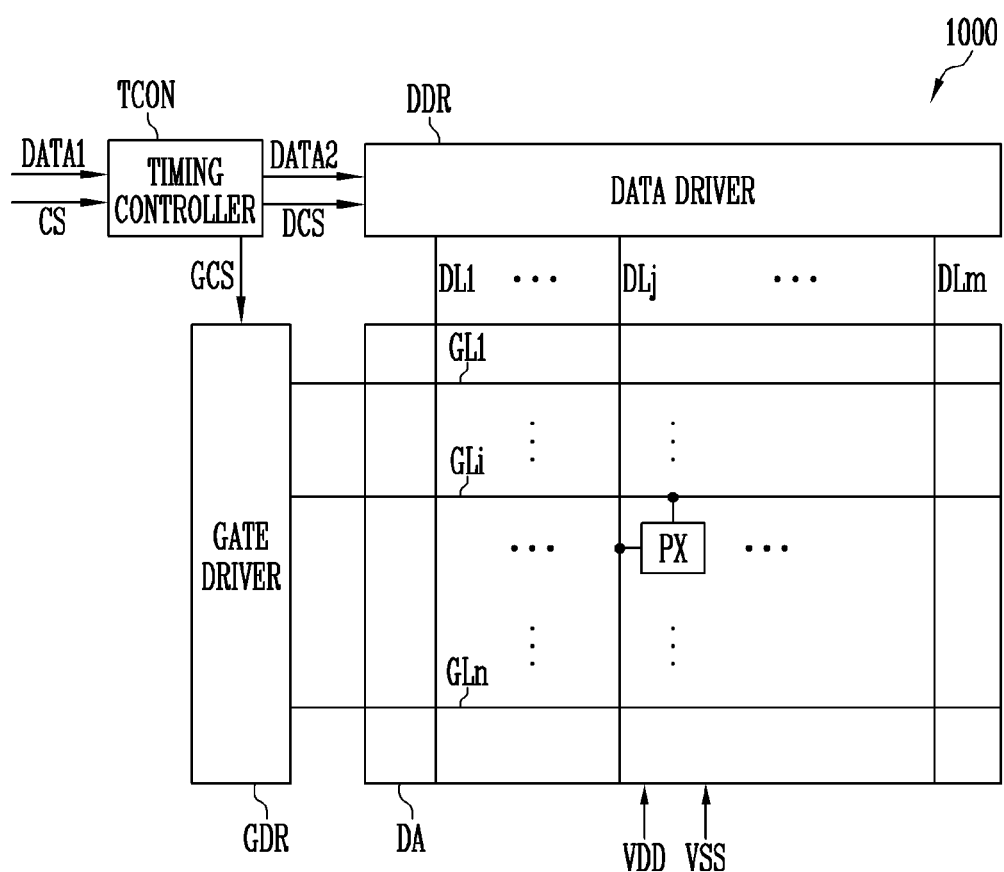
FIG. 2 is a schematic block diagram of the display device in accordance with an embodiment.

FIG. 1 is a schematic perspective view of a display device in accordance with an embodiment. FIG. 2 is a schematic block diagram of the display device in accordance with an embodiment.

In this specification, the terms "upper portion," "top," and "upper surface" may designate a third direction D3, and the terms "lower portion," "bottom," and "lower surface" may designate a direction opposite to the third direction D3. In addition, the terms "right," "left," "top," and "bottom" may designate directions when the display device 1000 may be viewed on a plane. For example, the term "top" may designate a first direction D1, the term "bottom" may designate a direction opposite to the first direction D1, the term "right" may designate a second direction D2, and the "left" may designate a direction opposite to the second direction D2.

Referring to FIGS. 1 and 2, the display device 1000 in accordance with an embodiment may have a rectangular shape on a plane or in a plan view. For example, the display device 1000 may have a rectangular planar shape having long sides in the first direction D1 and short sides in the second direction D2. A corner at which a long side in the first direction D1 and a short side in the second direction D2 meet each other may be formed at a right angle or be formed round to have a predetermined curvature. The planar shape of the display device 1000 is not limited to a rectangular shape, but may be formed in another polygonal shape, or other polygonal shapes, a circular shape or an elliptical shape within the spirit and scope of the disclosure.

The display device 1000 in accordance with an embodiment may include a display region DA, a non-display region NDA, and a light incident region LA.

The display region DA may be a region in which an image or images may be displayed, and the non-display region NDA may be a region in which the image or images may not be displayed. The non-display region NDA may be located or disposed at the periphery of the display region DA, and may surround or border the display region DA.

The light incident region LA may be a region included in the non-display region NDA, and may be located or disposed adjacent to at least one side of the display region DA. Although a structure in which the light incident region LA may be located or disposed adjacent to an upper short side of the display region DA is exemplified in FIG. 1, the disclosure is not limited thereto. For example, the light incident region LA may be located or disposed adjacent to at least one long side of the display region DA. For example, the display device 1000 may include at least one light incident region LA or more than at least one light incident region LA. For example, the light incident region LA may be located or disposed adjacent to both a long side and a short side of the display region DA.

The light incident region LA may be a region in which external light may be incident into the display device 1000. The external light incident into the display device 1000 in the light incident region LA may be emitted to the outside by components located or disposed in the light incident region LA and the display region DA.

The display device 1000 may include an element and a circuit, which may be used to display an image, for example, a self-light emitting element and a pixel circuit such as a switching element. In an embodiment, the self-light emitting element may include at least one of an organic light emitting diode, a quantum dot light emitting diode, an inorganic material-based micro light emitting diode (for example, a micro LED), or an inorganic material-based nano light emitting diode (for example, nano LED). Hereinafter, for convenience of description, a case where the self-light emitting element may be an organic light emitting diode will be described as an example.

The display device 1000 in accordance with an embodiment may include a gate driver GDR, a data driver DDR, and a timing controller TCON, which may be located or disposed adjacent to the display region DA. Scan lines GL1 to GLn (n is a positive integer greater than 1), data lines DL1 to DLm (m is a positive integer greater than 1), and pixels PX may be located or disposed in the display region DA. The scan lines GL1 to GLn may be located or disposed in the display region DA to extend in one direction (for example, a lateral direction), and the data lines DL1 to DLm may be located or disposed to extend along a direction (for example, a longitudinal direction) intersecting the scan lines GL1 to GLn.

The pixels PX may be arranged in regions (for example, pixel regions) defined by the scan lines GL1 to GLn and the data lines DL1 to DLm, which may be located or disposed along the lateral and longitudinal directions).

The pixels PX may be arranged in a matrix form or shape having rows and columns in the display region DA. Each pixel PX may be connected to at least one of the scan lines GL1 to GLn and at least one of the data lines DL1 to DLm.

First and second power sources VDD and VSS may be provided to the pixels PX. The first and second power sources VDD and VSS may be voltages necessary for operations of the pixels PX, and the first power source VDD may have a voltage level higher than that of the second power source VSS.

The gate driver GDR may receive a gate control signal GCS including a scan start signal and a clock signal from the timing controller TCON. A third power source and a fourth power source, which may be necessary for an operation of the gate driver GDR, may be provided to the gate driver GDR. For example, the third power source may be a voltage having a logic high level, and the fourth power source may be a voltage having a logic low level.

The gate driver GDR may generate a scan signal, and sequentially provide the scan signal to the scan lines GL1 to GLn. The gate driver GDR may include a shift register (or stage) to sequentially generate and output a scan signal in a pulse form, which may correspond to a start signal in a pulse form, by using the clock signal of the gate control signal GCS. The scan signal in the pulse form, which may be generated by the gate driver GDR, may be applied to each pixel PX.

The data driver DDR may generate data signals, based on image data DATA2 and a data control signal DCS, which may be provided from the timing controller TCON, and provide the data signals to the pixels PX. The data control signal DCS may be a signal for controlling an operation of the data driver DDR, and may include a load signal (or data enable signal) for instructing output of a valid data signal, and the like. Each pixel PX may receive a data signal through a corresponding data line among the data lines DL1 to DLm, and may emit light with a luminance corresponding to the data signal.

The timing controller TCON may receive input image data DATA1 and a control signal CS from the outside (for example, a graphic processor), generate the gate control signal GCS and the data control signal DCS, based on the control signal CS, and generate the image data DATA2 by converting the input image data DATA1.

Figure 3:
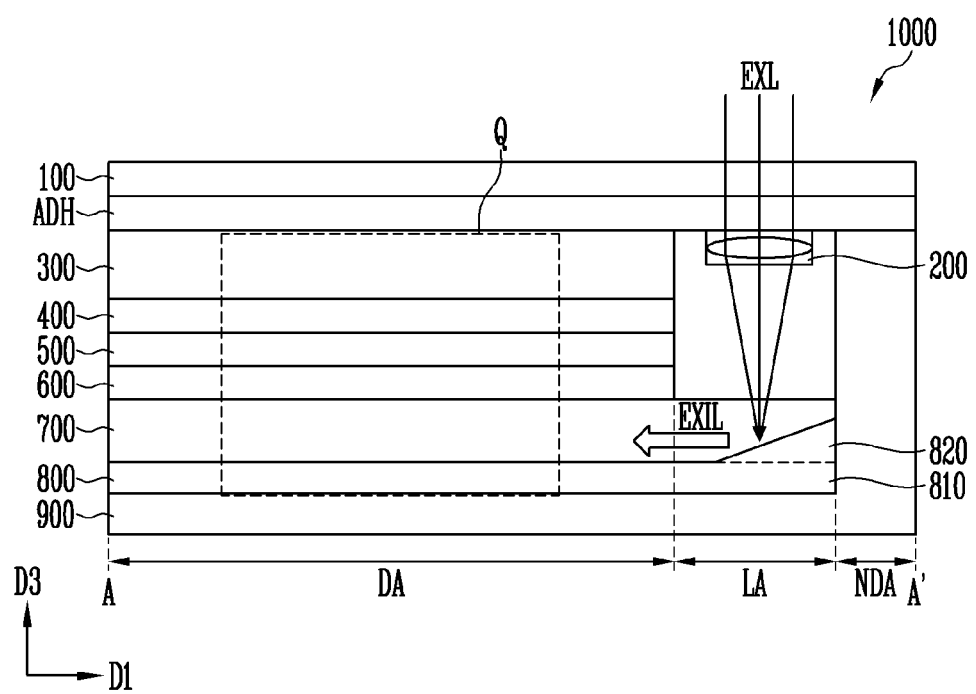
FIG. 3 is a schematic cross-sectional view taken along line A-A' shown in FIG. 1.
Figure 4:
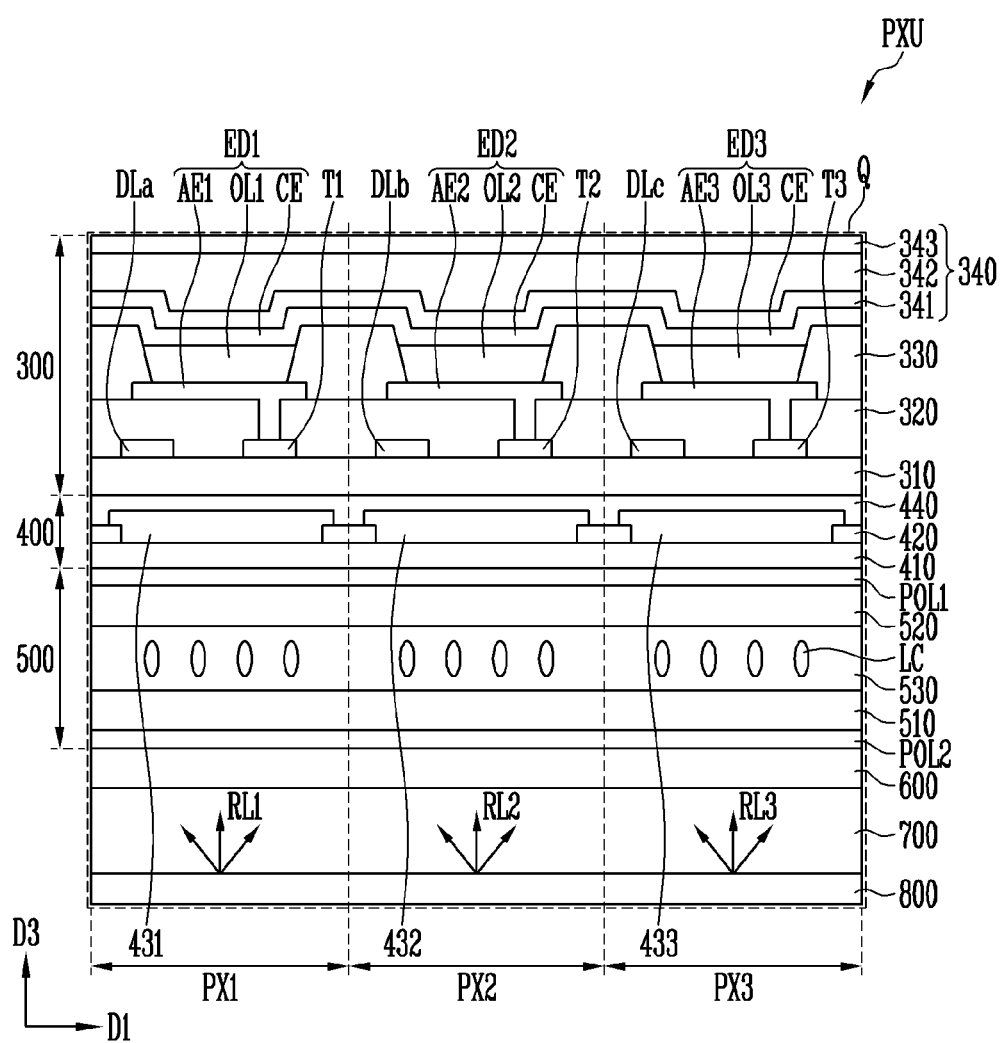
FIG. 4 is an enlarged schematic cross-sectional view of region Q shown in FIG. 3, which is a view illustrating a pixel unit in accordance with an embodiment.

FIG. 3 is a schematic cross-sectional view taken along line A-A' shown in FIG. 1. FIG. 4 is an enlarged sectional view of region Q shown in FIG. 3, which is a view illustrating a pixel unit in accordance with an embodiment.

Referring to FIGS. 3 and 4, the display device 1000 may include a window 100, a light condensing element 200, a first display panel 300, a color conversion layer 400, a second display panel 500, a diffusion plate 600, a light guide plate 700, a reflective plate 800, and a bracket 900. The light condensing element 200 may be a light condensing lens or light condensing lenses or any other element or structure that condenses light within the spirit and the scope of the disclosure. For example, the light condensing element 200 may be a glass, plastic, or meniscus within the spirt and the scope of the disclosure. The light condensing element 200 may include more than one light condensing element within the spirit and the scope of the disclosure.

As described above, the display device 1000 may include the display region DA, the light incident region LA, and the non-display region NDA. The first display panel 300, the color conversion layer 400, the second display panel 500, and the diffusion plate 600 may be located or disposed in the display region DA, the light condensing element 200 may be located or disposed in the light incident region LA, and the window 100, the light guide plate 700, and the reflective plate 800 may be located or disposed to extend in the display region DA and the light incident region LA.

The bracket, for example, may provide a space in which the above-described components are to be located or disposed, and may protect the above-described components from external impact. The bracket 900 may support the window 100, the light condensing element 200, the first display panel 300, the color conversion layer 400, the second display panel 500, the diffusion plate 600, the light guide plate 700, and the reflective plate 800. The bracket 900 may be made of a synthetic resin material, a metallic material, or a combination of different kinds of materials.

The window 100 may be located or disposed on the top of (or above) the first display panel 300. Therefore, the window 100 may function to protect an upper surface of the first display panel 300. The window 100 may be attached to the first display panel 100 and/or the bracket 900 through an adhesive layer ADH as shown in FIG. 3. The adhesive layer ADH may be an optically clear adhesive film (OCA) or optically clear resin (OCR), but the disclosure is not limited thereto.

The window 100 may be made of a light transmissive material. For example, the window 100 may be made of glass, sapphire, and/or plastic. The window 100 may be rigid or flexible.

The light condensing element 200 may be located or disposed in the light incident region LA. For example, the light condensing element 200 may be provided at a side portion of the first display panel 300 which will be described later. In an embodiment, the light condensing element 200 may be located or disposed below the window 100 in the light incident region LA. When the light condensing element 200 may be located or disposed below the window 100, the light condensing element 200 may be attached to the window 100 by the adhesive layer ADH, but the disclosure is not limited thereto. In an embodiment, the light condensing element 200 may be located or disposed in the window 100.

External light EXL incident into the light incident region LA of the display device 1000 may be transmitted through the window 100 and then incident into the light condensing element 200. The light condensing element 200 may condense the incident external light EXL and may transmit the condensed external light EXL toward one end portion of the light guide plate 700 and the reflective plate 800 under the first display panel 300. The external light EXL may be white light including all of red light, green light, and blue light.

The light guide plate 700 may guide an advancing path of light. For example, light incident at a side of the light guide plate 700 may be entirely scattered in the light guide plate 700 through total reflection in the light guide plate 700.

The light guide plate 700 may have an approximately polygonal column shape but the disclosure is not limited thereto. A plane on which an upper surface of the light guide plate 700 may be located or disposed and a plane on which a lower surface of the light guide plate 700 may be located or disposed may be approximately parallel to each other in the display region DA. For example, the light guide plate 700 may have an approximately uniform thickness in the display region DA.

The light guide plate 700 may include an inclined surface located or disposed between the lower surface of the light guide plate 700 and a side surface of the light guide plate 700. For example, the light guide plate 700 may include a chamfer formed by cutting a corner at which the lower surface and the side surface of the light guide plate 700 meet each other. A shape of the formed chamfer may correspond to that of a protrusion part 820 of the reflective plate 800 which will be described later.

The light guide plate 700 may include an inorganic material. For example, the light guide plate 700 may be made of glass. However, the disclosure is not limited thereto, for example, the light guide plate 700 may be made of plastic.

The reflective plate 800 may be located or disposed below the light guide plate 700. The reflective plate 800 may be made of a metallic material having high reflexibility. In an embodiment, the reflective plate 800 may be a metal layer including silver (Ag). The reflective plate 800 may include a flat part 810 and the protrusion part 820. The flat part 810 of the reflective plate 800 may be located or disposed in the display region DA and the light incident region LA, or may be entirely located or disposed in the display region DA and the light incident region LA. The protrusion part 820 of the reflective plate 800 may be located or disposed at one end portion of an upper surface of the flat part 810. The flat part 810 and the protrusion part 820 may be integrally formed. For example, the protrusion part 820 may be a region protruding or extending to have an inclined surface at an end portion of the flat part 810. However, the disclosure is not limited thereto, and the flat part 810 and the protrusion part 820 may be formed separately from each other to be attached to each other.

The flat part 810 of the reflective plate 800 may reflect light emitted from a lower portion of the light guide plate 700 and allow the light to be again incident into the light guide plate 700. For example, the flat part 810 of the reflective plate 800 may reflect external incident light EXIL advancing toward the display region DA through the light guide plate 700 to be emitted upward.

The protrusion part 820 of the reflective plate 800 may reflect external light EXL condensed and incident by the light condensing element 200 to advance toward the display region DA. In other words, the external light EXL may be reflected by the protrusion part 820 of the reflective plate 800 to be incident as incident condensed light EXIL toward the display region DA along the light guide plate 700. The inclined surface of the protrusion part 820 may form a predetermined angle with the flat part 810. For example, the inclined surface of the protrusion part 820 may form an inclination angle in a range of about 30 degrees to about 60 degrees with the flat part 810. The protrusion part 820 may include any type of surface or any type of structure that may reflect external light EXL condensed and incident by the light condensing element 200 to advance toward the display region DA.

The first display panel 300, the color conversion layer 400, the second display panel 500, and the diffusion plate 600 will be described in detail with further reference to FIG. 4 in which a portion of the display region DA is enlarged.

Pixels PX1, PX2, and PX3 may be located or disposed in the display region DA, and each of the pixels PX1, PX2, and PX3 may emit lights of different colors. For example, a first pixel PX1 may be a red pixel emitting red light, a second pixel PX2 may be a green pixel emitting green light, and a third pixel PX3 may be a blue pixel emitting blue light. However, the colors of lights emitted from each of the pixels PX1, PX2, and PX3 are not limited thereto. In an embodiment, the colors of lights emitted from each of the pixels PX1, PX2, and PX3 may be yellow, magenta, or cyan. The pixels PX1, PX2, and PX3 emitting lights of different colors may constitute one pixel unit PXU.

In the display region DA, the first display panel 300 may include a first base substrate 310, first to third switching elements T1 to T3, an insulating layer 320, a bank layer 330, first to third light emitting elements ED1, ED2, and ED3, and a thin film encapsulation layer 340.

The first to third light emitting elements ED1, ED2, and ED3 may be organic light emitting elements including an organic emitting layer, and the first display panel 300 may be an organic light emitting display panel including the organic light emitting elements.

The first base substrate 310 may be made of a material having light transmissivity. The first base substrate 310 may be a glass substrate or a plastic substrate.

At least one switching element T1, T2, and T3 may be located or disposed for each of the pixels PX1, PX2, and PX3 on the first base substrate 310. Data lines DLa, DLb, and DLc, scan lines (not shown), and power lines (not shown), through which driving signals may be transferred to the switching elements T1, T2, and T3, may be located or disposed on the first base substrate 310.

The insulating layer 320 may be located or disposed over the first to third switching elements T1, T2, and T3. The insulating layer 320 may be configured as an organic layer. For example, the insulating layer 320 may include acryl-based resin, epoxy-based resin, imide-based resin, ester-based resin, or other resin.

Pixel electrodes AE1, AE2, and AE3 provided in the respective pixels PX1, PX2, and PX3 may be located or disposed on the insulating layer 320. The pixel electrodes AE1, AE2, and AE3 may be electrically connected to the switching elements T1, T2, and T3 through via-holes penetrating the insulating layer 320, respectively.

In an embodiment, each of the pixel electrodes AE1, AE2, and AE3 may be an anode electrode of an organic light emitting element. The pixel electrodes AE1, AE2, and AE3 may include a material having a high work function, into which holes may be easily injected, for example, Indium Tin Oxide (ITO), Indium Zinc Oxide (IZO), Zinc Oxide (ZnO), Indium Oxide ($In_2O_3$), or other materials. In an embodiment, the pixel electrodes AE1, AE2, and AE3 may have a double-layered structure such as ITO/Ag, Ag/ITO or ITO/MgF or a multi-layered structure such as ITO/Ag/ITO.

The bank layer 330 may be located or disposed over the pixel electrodes AE1, AE2, and AE3. The bank layer 330 may be located or disposed along a boundary between the pixels PX1, PX2, and PX3. The bank layer 330 may include an opening that may be formed in a lattice shape and at least may partially expose the pixel electrodes AE1, AE2, and AE3.

Each of the pixels PX1, PX2, and PX3 may include an emission region and a non-emission region, and the emission region and the non-emission region may be distinguished from each other by the bank layer 330. For example, a region covered by the bank layer 330 may be the non-emission region, and a region in which each of the pixel electrodes AE1, AE2, and AE3 may be exposed by the opening of the bank layer 330 may be the emission region.

Sizes of regions exposed by the opening of the bank layer 330 may be different from each other. For example, areas of the emission regions of the pixels PX1, PX2, and PX3 may be different from each other. However, the disclosure is not limited thereto, and the areas of the emission regions may be equal to each other.

In an embodiment, the bank layer 330 may include an organic insulating material such as polyacrylates resin, epoxy resin, phenolic resin, polyamides resin, unsaturated polyesters resin, polyphenylenethers resin, polyphenylenesulfides resin, or benzocyclobutene (BCB).

Organic layers OL1, OL2, and OL3 may be respectively located or disposed on the pixel electrodes AE1, AE2, and AE3 exposed by the opening of the bank layer 330.

The organic layers OL1, OL2, and OL3 may include emitting layers emitting lights of different colors. For example, a first organic layer OL1 may include a red emitting layer emitting red light, a second organic layer OL2 may include a green emitting layer emitting green light, and a third organic layer OL3 may include a blue emitting layer emitting blue light. However, the disclosure is not limited thereto. In an embodiment, the organic layers OL1, OL2, and OL3 may include emitting layers emitting lights of the same color. The organic layers OL1, OL2, and OL3 may also emit light of any of red light, green light, or blue light and are thus not limited to the first organic layer OL1 including a red emitting layer emitting red light, a second organic layer OL2 including a green emitting layer emitting green light, and a third organic layer OL3 including a blue emitting layer emitting blue light. For example, the first organic layer OL1 may include a green emitting layer emitting green light, the second organic layer OL2 may include a red emitting layer emitting red light, and the third organic layer OL3 may include a blue emitting layer emitting blue light.

In an embodiment, each of the organic layers OL1, OL2, and OL3 may include at least one of a Hole Transport Layer (HTL) and an Electron Transport Layer (ETL). In an embodiment, each of the organic layers OL1, OL2, and OL3 may include emitting layers, and may include a Charge Generation Layer (CGL) located or disposed between the emitting layers. Therefore, the CGL may include an n-type CGL and a p-type CGL.

A common electrode CE may be located or disposed over the organic layers OL1, OL2, and OL3. The common electrode CE may be entirely located or disposed regardless of the structure or arrangement of the pixels PX1, PX2, and PX3.

When each of the pixel electrodes AE1, AE2, and AE3 is an anode electrode of an organic light emitting element, for example, the common electrode CE may be a cathode electrode of the organic light emitting element. The common electrode CE may include a material having a low work function, into which electrons may be easily injected, for example, Li, Ca, LiF/Ca, LiF/Al, Al, Mg, Ag, Pt, Pd, Ni, Au, Nd, Ir, Cr, BaF, Ba, or a compound or mixture thereof (for example, a mixture of Ag and Mg).

The common electrode CE may have transmissivity or semi-transmissivity. When the material having a low work function is formed thin enough to have a thickness of a few to a few hundreds of angstroms, the common electrode may have transmissivity or semi-transmissivity. When a metal thin film having a low work function is used, the common electrode CE may include a transparent conductive material layer stacked on the metal thin film, such as Tungsten Oxide ($WxOx$), Titanium Oxide ($TiO_2$), Indium Tin Oxide (ITO), Indium Zinc Oxide (IZO), Zinc Oxide (ZnO), Indium Tin Zinc Oxide (ITZO), or Magnesium Oxide (MgO) so as to decrease resistance while ensuring transmissivity.

The first pixel electrode AE1, the first organic layer OL1, and the common electrode CE may constitute the first light emitting element ED1, the second pixel electrode AE2, the second organic layer OL2, and the common electrode CE may constitute the second light emitting element ED2, and the third pixel electrode AE3, the third organic layer OL3, and the common electrode CE may constitute the third light emitting element ED3.

The thin film encapsulation layer 340 may be located or disposed on the common electrode CE. The thin film encapsulation layer 340 may be located or disposed over the light emitting elements ED1, ED2, and ED3, to encapsulate the first display panel 300 in order to prevent a foreign material or moisture from penetrating from the outside.

The thin film encapsulation layer 340 may be entirely located or disposed regardless of the structure or arrangement of the pixels PX1, PX2, and PX3. Although not shown in FIG. 4, a capping layer covering the common electrode CE may be located or disposed between the thin film encapsulation layer 340 and the common electrode CE. Therefore, the thin film encapsulation layer 340 may directly cover the capping layer.

The thin film encapsulation layer may include a first encapsulation inorganic layer 341, an encapsulation organic layer 342, and a second encapsulation inorganic layer 343, which may be sequentially stacked on the common electrode CE.

Each of the first encapsulation inorganic layer 341 and the second encapsulation inorganic layer 343 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), lithium fluoride, and other materials within the spirit and the scope of the disclosure.

The encapsulation organic layer 342 may be made of, for example, acryl-based resin, methacryl-based resin, polyisoprene, vinyl-based resin, epoxy-based resin, urethane-based resin, cellulose-based resin, perylene-based resin, and other materials within the spirit and the scope of the disclosure.

The first encapsulation inorganic layer 341 may be located or disposed on one surface of the common electrode CE. The common electrode CE may include a surface having an uneven shape by reflecting a step difference thereunder. The first encapsulation inorganic layer 341 may be made of an inorganic material to reflect at least a portion of the uneven shape of the common electrode CE. For example, similar to the common electrode CE, the first encapsulation inorganic layer 341 may include a surface having an uneven shape.

The encapsulation organic layer 342 may be located or disposed on one surface of the first encapsulation inorganic layer 341. The encapsulation organic layer 342 may fill the uneven shape of the surface of the first encapsulation inorganic layer 341 that may reduce or planarize a step difference thereunder.

The second encapsulation inorganic layer 343 may be located or disposed on one surface of the encapsulation organic layer 342. The second encapsulation inorganic layer 343 may be formed approximately flat along the surface shape of the encapsulation organic layer 342.

The structure of the thin film encapsulation layer 340 is not limited to the above-described example, and the stacked structure of the thin film encapsulation layer 340 may be variously modified within the spirt and the scope of the disclosure.

The color conversion layer 400 may be located or disposed below the first display panel 300. The color conversion layer 400 may include a second base substrate 410, a light blocking member 420, color filters 431, 432, and 433, and an overcoat layer 440.

The second base substrate 410 may be made of a material having light transmissivity. The second base substrate 410 may be, for example, a glass substrate or a plastic substrate.

The light blocking member 420 may be located or disposed on the second base substrate 410. The light blocking member 420 may be located or disposed along the boundary between the pixels PX1, PX2, and PX3, and may block the transmission of light. For example, the light block member 420 may be formed in a lattice shape in a plan view, and may prevent color mixture from occurring due to the penetration of light between adjacent pixels PX1, PX2, and PX3.

The light blocking member 420 may be formed of an organic material including at least one of graphite, carbon black, black pigment, and black dye, or may be formed of a metallic material including chromium (Cr). However, the material is not particularly limited as long as the material can block the transmission of light and absorb light.

The color filters 431, 432, and 433 may be located or disposed on the second base substrate 410 and the light blocking member 420. A first color filter 431 may be located or disposed in the first pixel PX1, a second color filter 432 may be located or disposed in the second pixel PX2, and a third color filter 433 may be located or disposed in the third pixel PX3.

Each of the color filters 431, 432, and 433 may be a light absorptive filter that may selectively transmit one of lights of different colors and may block the advancement of lights of the other colors by absorbing the lights. For example, the first color filter 431 may transmit red light and block green light and blue light. The second color filter 432 may transmit green light and block red light and blue light. The third color filter 433 may transmit blue light and block red light and green light.

Although a structure in which the color filters 431, 432, and 433 may not overlap with each other is exemplified in FIG. 4, the disclosure is not limited thereto. For example, at least portions of the color filters 431, 432, and 433 may overlap with each other on the light blocking member 420.

The overcoat layer 440 may be located or disposed over the light blocking member 420 and the color filters 431, 432, and 433. The overcoat layer 440 may reduce or planarize a step difference formed on the second base substrate 410 by the light blocking member 420 and the color filters 431, 432, and 433.

The second display panel 500 may be located or disposed below the color conversion layer 400. The second display panel 500 may include a first liquid crystal substrate 510, a second liquid crystal substrate 520, a liquid crystal layer 530, and polarizing plates POL1 and POL2. For example, the second display panel 500 may be a liquid crystal display panel including a liquid crystal layer.

The first liquid crystal substrate 510 and the second liquid crystal substrate 520 may be located or disposed to face each other, and may be made of a material having light transmissivity. For example, each of the first liquid crystal substrate 510 and the second liquid crystal substrate 520 may be a glass substrate or a plastic substrate.

The liquid crystal layer 530 may be interposed between the first liquid crystal substrate 510 and the second liquid crystal substrate 520, and may include liquid crystals LC. When an electric field is formed or generated in the liquid crystal layer 530, the liquid crystals LC may be rotated according to the formed or generated electric field.

A first polarizing plate POL1 may be located or disposed on the top (or above) of the second liquid crystal substrate 520, and a second polarizing plate POL2 may be located or disposed below the first liquid crystal substrate 510. However, the arrangement of the polarizing plates POL1 and POL2 is not limited thereto. For example, the first polarizing plate POL1 may be located or disposed between the second liquid crystal substrate 520 and the liquid crystal layer 530, or the second polarizing plate POL2 may be located or disposed between the first liquid crystal substrate 510 and the liquid crystal layer 530. Each of the first and second polarizing plates POL1 and POL2 may be a reflective polarizing plate. Each of the first and second polarizing plates POL1 and POL2 may transmit light having a polarization component parallel to a transmission axis, and may reflect light having a polarization component parallel to a reflection axis. The transmission axes of the first polarizing plate POL1 and the second polarizing plate POL2 may intersect each other.

The transmittance of light transmitted through the second display panel 500 may vary depending on an electric field formed or generated in the second display panel 500.

The diffusion plate 600 may be located or disposed below the second display panel 500. The diffusion plate 600 may be a film or resin including light diffusing particles. The diffusion plate 600 may allow entirely uniform light to be emitted by diffusing light incident into the diffusion plate 600.

The light guide plate 700 and the reflective plate 800 may be located or disposed below the diffusion plate 600.

As shown in FIG. 3, external light EXL incident into the display device 1000 through the light condensing element 200 of the light incident region LA may be incident into one end portion of the light guide plate 700 and the reflective plate 800. For example, the light condensing element 200 may condense external light EXL to advance toward the protrusion part 820 of the reflective plate 800.

Accordingly, the external light EXL may be reflected by the protrusion part 820 provided at one end portion of the reflective plate 800, to advance as incident light EXIL toward the display region DA through the light guide plate 700.

The incident light EXIL may be entirely scattered in the display region DA along the light guide plate 700. Incident light EXIL toward the lower surface of the light guide plate 700 among incident lights EXIL advancing along an internal light path of the light guide plate 700 may be reflected upward by the reflective plate 800 located or disposed below the light guide plate 700. Incident light EXIL toward the upper surface of the light guide plate 700 among the incident lights EXIL advancing along the internal light path of the light guide plate 700 may be reflected from the upper surface of the light guide plate 700 to be again incident into the light guide plate 700 or be refracted at the upper surface of the light guide plate 700 to be transmitted toward the diffusion plate 600, according to an incident angle.

As shown in FIG. 4, incident light EXIL reflected by the reflective plate 800 from the lower surface of the light guide plate 700 or refracted at the upper surface of the light guide plate 700 to be transmitted through the light guide plate 700 may advance as transmitted light RL1, RL2, and RL3 toward the diffusion plate 600.

First to third transmitted lights RL1, RL2, and RL3 may be uniformly scattered in the display region DA by the diffusion plate 600. The first transmitted light RL1 may be light transmitted toward the second display panel 500 in the first pixel PX1, the second transmitted light RL2 may be light transmitted toward the second display panel 500 in the second pixel PX2, and the third transmitted light RL3 may be light transmitted toward the second display panel 500 in the third pixel PX3.

An electric field may be formed or generated between the data lines DLa, DLb, and DLc of the first display panel 300 and the reflective plate 800. When the liquid crystals LC of the liquid crystal layer 530 are rotated according to the electric field, the transmittance of the second display panel 500 may vary, and the transmitted lights RL1, RL2, and RL3 may be transmitted through the second display panel 500 and then emitted to the outside.

For example, when the first light emitting element ED1 of the first pixel PX1 is not driven, any electric field may not be formed or generated in the second display panel 500, and therefore, the first transmitted light RL1 may be blocked by the second display panel 500. When a data signal may be applied to a first data line DLa to drive the first light emitting element ED1 of the first pixel PX1, an electric field may be formed or generated between the first data line DLa and the reflective plate 800. Accordingly, the transmittance of the second display panel 500 in the first pixel PX1 may be changed, so that the first transmitted light RL1 may be transmitted through the second display panel 500. Also, the first transmitted light RL1 may be transmitted through the color conversion layer 400 and the first display panel 300 to be emitted to the outside.

In an embodiment, any separate voltage may not be applied to the reflective plate 800, but the disclosure is not limited thereto. In an embodiment, a separate voltage may be applied to the reflective plate 800. Therefore, a strong electric field may be formed between the data lines DLa, DLb, and DLc of the first display panel 300 and the reflective plate 800, and the liquid crystals LC of the second display panel 500 may be sufficiently rotated.

The transmitted lights RL1, RL2, and RL3 transmitted through the second display panel 500 may be incident into the color conversion layer 400. The color conversion layer 400 may include the color filters 431, 432, and 433, and the colors of the transmitted lights RL1, RL2, and RL3 may be changed by the color filters 431, 432, and 433.

As described above, the external light EXL incident into the display device 1000 may be white light including all of red light, green light, and blue light, and accordingly, each of the incident light EXIL incident into the light guide plate 700 and the transmitted lights RL1, RL2, and RL3 transmitted through the light guide plate 700 may also be white light including all of red light, green light, and blue light.

The transmitted lights RL1, RL2, and RL3 may allow only light of one of the colors of light to be transmitted by the respective color filters 431, 432, and 433, and absorb lights of the other colors.

For example, the first color filter 431 of the first pixel PX1 may transmit only red light of the first transmitted light RL1 transmitted through the second display panel 500, and absorb green light and blue light. For example, the first transmitted light RL1 transmitted through the first color filter 431 may be red light. Similarly, the second transmitted light RL2 transmitted through the second color filter 432 may be green light, and the third transmitted light RL3 transmitted through the third color filter 433 may be blue light.

The transmitted lights RL1, RL2, and RL3 transmitted through the color conversion layer 400 may be emitted to the outside together with lights emitted from the first to third light emitting elements ED1, ED2, and ED3 of the first display panel 300.

For example, the first light emitting element ED1 may emit red light by means of the first organic layer OL1 including the red emitting layer, and the first transmitted light RL1 of red, which may be transmitted through the first color filter 431, may be emitted to the outside together with the red light emitted from the first light emitting element ED1. The second light emitting element ED2 may emit green light by means of the second organic layer OL2 including the green emitting layer, and the second transmitted light RL2 of green, which may be transmitted through the second color filter 432, may be emitted to the outside together with the green light emitted from the second light emitting element ED2. The third light emitting element ED3 may emit blue light by means of the third organic layer OL3 including the blue emitting layer, and the third transmitted light RL3 of blue, which may be transmitted through the third color filter 432, may be emitted to the outside together with the blue light emitted from the third light emitting element ED3.

Accordingly, luminances of lights emitted to the outside from the first to third pixels PX1, PX2, and PX3 may be higher than those of lights emitted from the light emitting elements ED1, ED2, and ED3.

As described above, external light EXL may be condensed and incident into one end portion of the light guide plate 700 and the reflective plate 800, and may advance as incident light EXIL toward the display region DA by means of the protrusion part 820 of the reflective plate 800. The incident light EXIL may be uniformly scattered in the light guide plate 700 to advance as transmitted lights RL1, RL2, and RL3 toward the diffusion plate 600. The transmitted lights RL1, RL2, and RL3 may be entirely uniformly diffused by the diffusion plate 600 to advance toward the second display panel 500.

In order to drive the light emitting elements ED1, ED2, and ED3 of the first display panel 300, a data signal may be applied to the data lines DLa, DLb, and DLc, and an electric field may be formed or generated between the data lines DLa, DLb, and DLc and the reflective plate 800 according to the data signal applied to the data lines DLa, DLb, and DLc. The liquid crystals LC in the second display panel 500 may be rotated by the formed or generated electric field, and accordingly, the light transmittance of the second display panel 500 may be changed, so that lights emitted from the diffusion plate 600 may be transmitted through the second display panel 500.

Lights transmitted through the second display panel 500 may be incident into the color conversion layer 400 according to operations of the light emitting elements ED1, ED2, and ED3, and red light, green light, and blue light may be transmitted by the respective color filters 431, 432, and 433 of the color conversion layer 400 to be emitted to the outside. For example, the lights transmitted through the color conversion layer 400 may be emitted to the outside together with lights emitted from the light emitting elements ED1, ED2, and ED3 of the pixels PX1, PX2, and PX3.

As described above, the display device 1000 may increase display luminance through the light guide plate 700 and the second display panel 500 by using external light EXL, without increasing current consumption of the light emitting elements ED1, ED2, and ED3. A larger amount of light may be incident into the display device 1000 as the light amount of external light EXL increases, and accordingly, an amount of light transmitted through the second display panel 500 and then emitted to the outside may also increase. For example, the display device 1000 may adjust the display luminance of the display device 1000, corresponding to the light amount of external light.

Hereinafter, other embodiments of the display device will be described. In the following embodiments, components identical to those of the above-described embodiment are designated by like reference numerals, their descriptions will be omitted or simplified, and differences will be mainly described.

Figure 5:
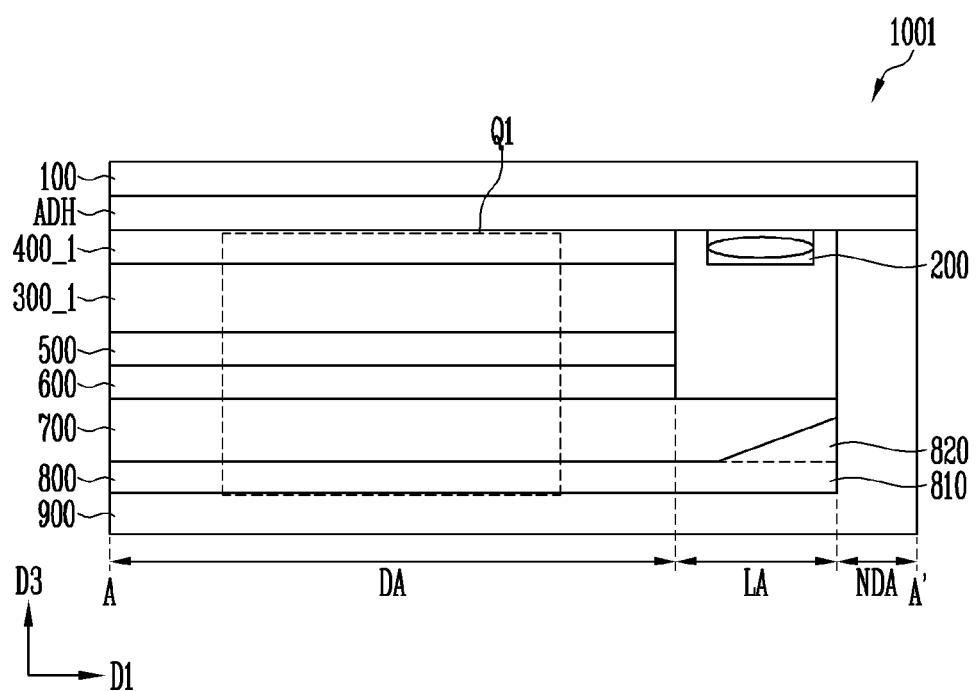
FIG. 5 is a schematic cross-sectional view of a display device in accordance with an embodiment, which is a schematic cross-sectional view corresponding to the line A-A' shown in FIG. 1.
Figure 6:
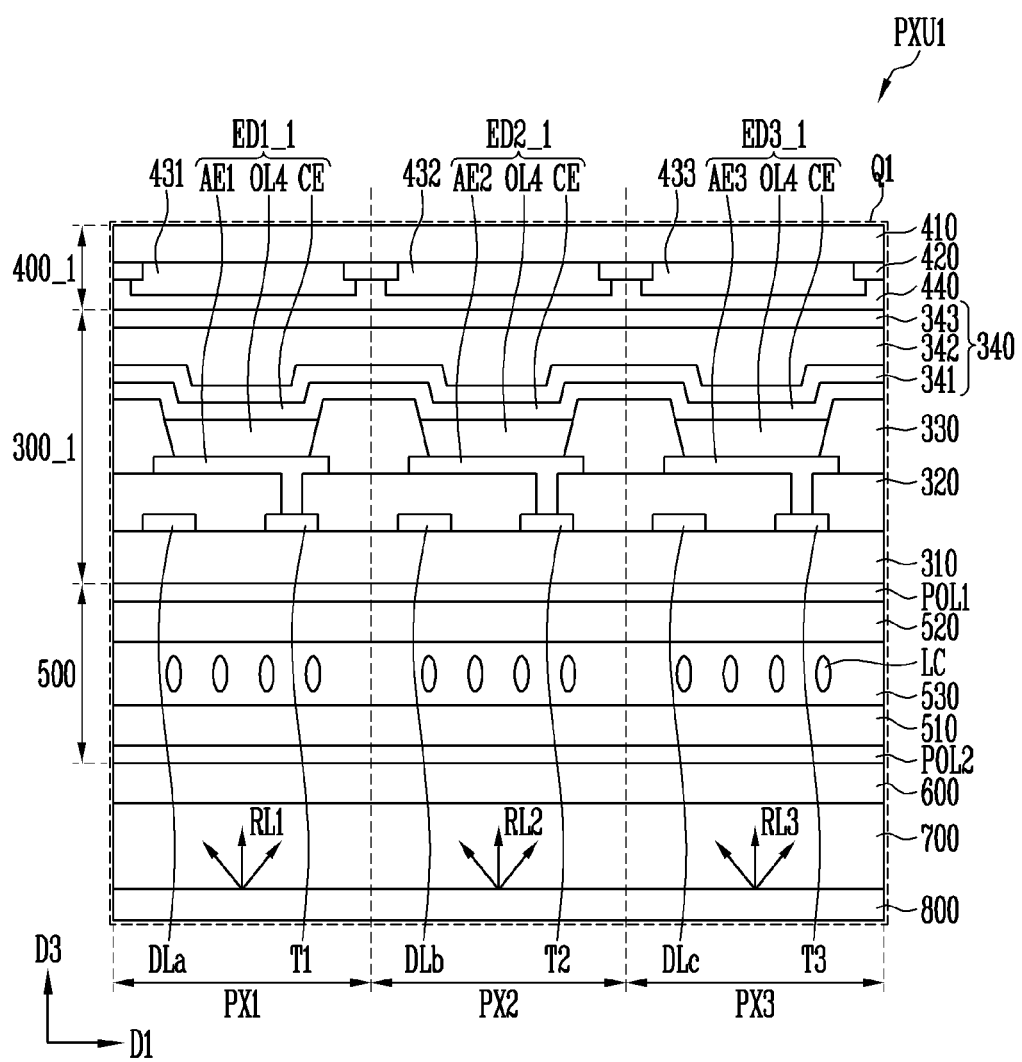
FIG. 6 is an enlarged schematic cross-sectional view of region Q1 shown in FIG. 5, which is a view illustrating a pixel unit in accordance with an embodiment.

FIG. 5 is a schematic cross-sectional view of a display device in accordance with an embodiment, which is a sectional view corresponding to the line A-A' shown in FIG. 1. FIG. 6 is an enlarged sectional view of region Q1 shown in FIG. 5, which is a view illustrating a pixel unit in accordance with an embodiment.

The embodiment shown in FIGS. 5 and 6 may be different from the embodiment shown in FIGS. 3 and 4 in that each of light emitting elements ED1_1, ED2_1, and ED3_1 may include the same organic layer OL4 to emit light of the same color, and a color conversion layer 400_1 may be located or disposed on the top (or above) of a first display panel 300_1.

Referring to FIGS. 5 and 6 in conjunction with FIGS. 3 and 4, the display device 1001 may include the light condensing element 200, the first display panel 300_1, the color conversion layer 400_1, the second display panel 500, the diffusion plate 600, the light guide plate 700, and the reflective plate 800.

The first display panel 300_1, the color conversion layer 400_1, the second display panel 500, and the diffusion plate 600 may be located or disposed in the display region DA, the light condensing element 200 may be located or disposed in the light incident region LA, and the light guide plate 700 and the reflective plate 800 may be located or disposed to extend in the display region DA and the light incident region LA.

External light incident into the display device 1001 through the light condensing element 200 of the light incident region LA may be uniformly scattered by the light guide plate 700 and the diffusion plate 600 to advance toward the second display panel 500. An electric field may be formed or generated between the data lines DLa, DLb, and DLc and the reflective plate 800 according to an operation of each of the light emitting elements ED1_1, ED2_1, and ED3_1 of the first display panel 300_1, and the light transmittance of the second display panel 500 may be changed. When the light transmittance of the second display panel 500 is changed, external lights incident into the display device 1001 may be transmitted through the second display panel 500 and then transmitted through the first display panel 300_1 and the color conversion layer 400_1 to be emitted to the outside.

The light emitting elements ED1_1, ED2_1, and ED3_1 of the first display panel 3001 may emit lights of the same color. For example, a fourth organic layer OL4 that may be included in each of the light emitting elements ED1_1, ED2_1, and ED3_1 may include a white emitting layer, and light emitted from each of the light emitting elements ED1_1, ED2_1, and ED3_1 may be white light. In an embodiment, the fourth organic layer OL4 may include a multi-layered structure, and may include emitting layers.

White light emitted from each of the light emitting elements ED1_1, ED2_1, and ED3_1 may be incident into the color conversion layer 400_1 located or disposed on the top (or above) of the first display panel 300_1. The white light incident into the color conversion layer 400_1 may have a color changed by the color conversion layer 400_1 to be output to the outside. For example, by the first to third color filters 431, 432, and 433 of the color conversion layer 400_1, white light transmitted through the first color filter 431 may be converted into red light and then emitted to the outside, white light transmitted through the second color filter 432 may be converted into green light and then emitted to the outside, and white light transmitted through the third color filter 433 may be converted into blue light and then emitted to the outside. As an example, external lights transmitted through the second display panel 500 may have a color changed by the color conversion layer 400_1 to be emitted to the outside.

Accordingly, each of the pixels PX1, PX2, and PX3 of the display device 1001 may emit lights of different colors, and constitute one pixel unit PXU1.

As described above, light emitted to the outside by the display device 1001 may include lights emitted from the light emitting elements ED1_1, ED2_1, and ED3_1 and external light incident into the display device 1001 by the light condensing element 200, and the display luminance of the display device 1001 may be improved corresponding to external brightness, without increasing current consumption of the light emitting elements ED1_1, ED2_1, and ED3_1.

Figure 7:
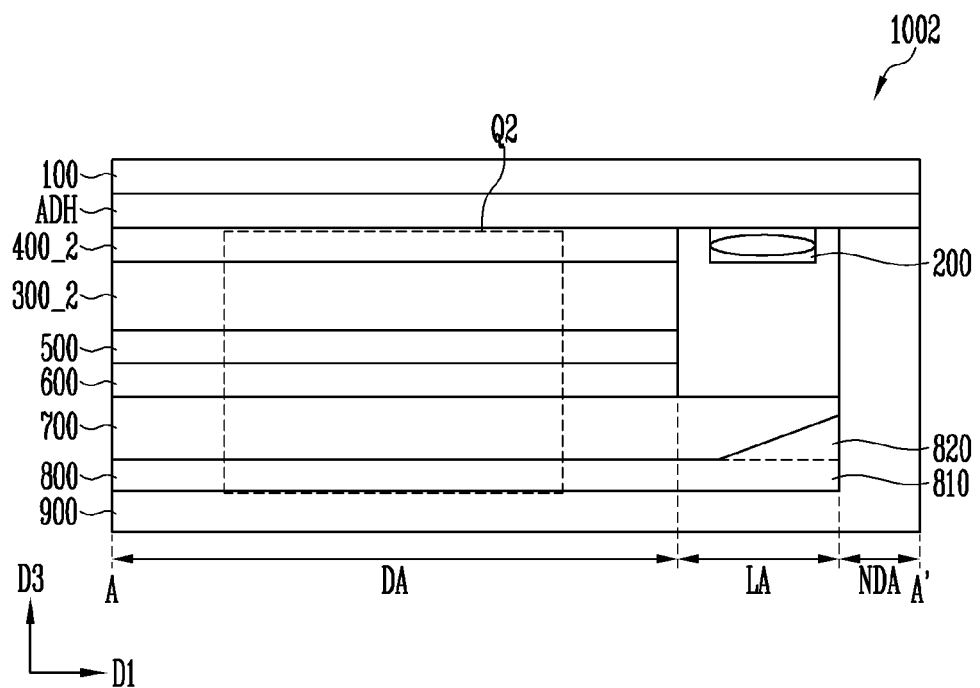
FIG. 7 is a schematic cross-sectional view of a display device in accordance with an embodiment, which is a sectional view corresponding to the line A-A' shown in FIG. 1.
Figure 8:
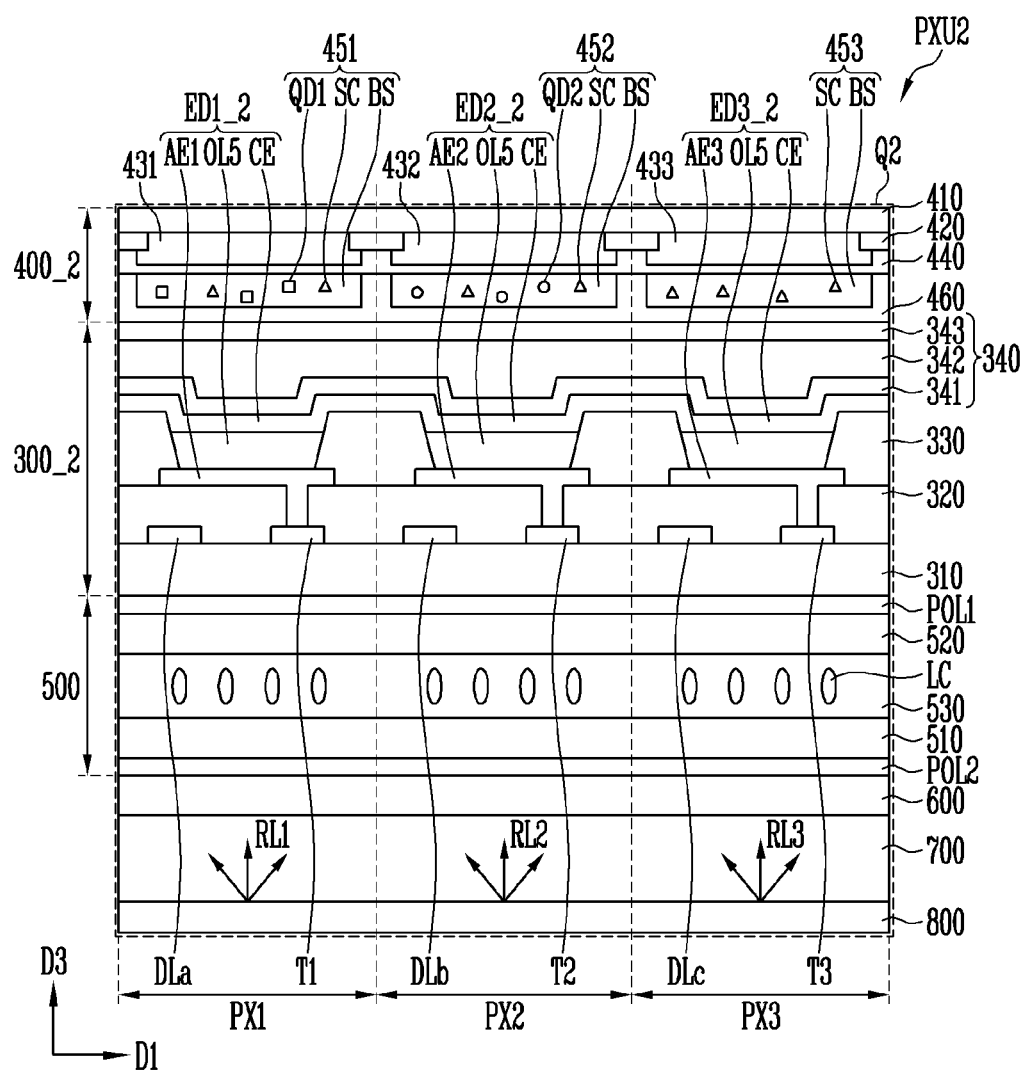
FIG. 8 is an enlarged schematic cross-sectional view of region Q2 shown in FIG. 7, which is a view illustrating a pixel unit in accordance with an embodiment.

FIG. 7 is a schematic cross-sectional view of a display device in accordance with an embodiment, which is a schematic cross-sectional view corresponding to the line A-A' shown in FIG. 1. FIG. 8 is an enlarged sectional view of region Q2 shown in FIG. 7, which is a view illustrating a pixel unit in accordance with an embodiment.

The embodiment shown in FIGS. 5 and 6 may be different from the embodiment shown in FIGS. 3 and 4 in that each of the light emitting elements ED1_1, ED2_1, and ED3_1 may include the same organic layer OL4 to emit light of the same color, and the color conversion layer 400_1 may be located or disposed on the top of (or above) the first display panel 300_1.

The embodiment shown in FIGS. 7 and 8 may be different from the embodiment shown in FIGS. 5 and 6 in that a color conversion layer 400_2 may include wavelength conversion members 451 and 452 and a light scattering member 453.

Each of light emitting elements ED1_2, ED2_2, and ED3_2 of a first display panel 300_2 may include the same organic layer OL5. For example, a fifth organic layer OL5 may be included in each of the light emitting elements ED1_2, ED2_2, and ED3_2 and may include a blue emitting layer, and light emitted from each of the light emitting elements ED1_2, ED2_2, and ED3_2 may be blue light. In an embodiment, the fifth organic layer OL5 may include a multi-layered structure, and may include emitting layers.

Blue light emitted from each of the light emitting elements ED1_2, ED2_2, and ED3_2 may be incident into the color conversion layer 400_2 located or disposed on the top of (or above) the first display panel 300_2. The blue light incident into the color conversion layer 400_2 may have a color changed by the color conversion layer 400_2 to be emitted to the outside.

The color conversion layer 400_2 may include the first to third color filters 431, 432, and 433. The color conversion layer 400_2 may include the wavelength conversion members 451, and 452 and the light scattering member 453, which may be located or disposed between the color filters 431, 432, and 433 and the first display panel 300_2.

A first wavelength conversion member 451 may be located or disposed in the first pixel PX1, and may not be located or disposed in the second pixel PX2 and the third pixel PX3. The first wavelength conversion member 451 may convert the wavelength of incident light and emit the converted light. For example, the first wavelength conversion member 451 may convert the color of the incident light and emit the converted light. For example, the first wavelength conversion member 451 may convert blue light into red light and emit the red light.

The first wavelength conversion member 451 may include a base resin BS and first wavelength conversion particles QD1 may be scattered in the base resin BS, and may include scattering particles SC scattered in the base resin BS.

The base resin BS is not particularly limited as long as the base resin BS may be made of a material that has a light transmittance and has an excellent scattering characteristic with respect to the first wavelength conversion particles QD1 and the scattering particles SC. For example, the base resin BS may include an organic material such as epoxy-based resin, acryl-based resin, cardo-based resin, or imide-based resin.

The first wavelength conversion particles QD1 may convert the wavelength of incident light. Examples of the first wavelength conversion particles QD1 may be quantum dots, quantum rods, phosphors, and other materials within the spirit and the scope of the disclosure. The quantum dots may be particle materials that emit light having a specific wavelength, while electrons are being transferred from a conduction band to a valence band.

The quantum dots may be semiconductor nanocrystalline materials. The quantum dots may have a specific band gap depending on their composition and size, and may emit light having an inherent band after absorbing light. Examples of the semiconductor nanocrystals of the quantum dots may include a Group IV based nanocrystal, a Group II-VI based compound nanocrystal, a Group III-V based compound nanocrystal, a Group IV-VI based nanocrystal, or a combination thereof.

For example, the group IV based nanocrystal may include a dyadic compound such as silicon (Si), germanium (Ge), silicon carbide (SiC), and silicon-germanium (SiGe). However, the disclosure is not limited thereto.

The group II-VI compound nanocrystals may include dyadic compounds, such as CdSe, CdTe, ZnS, ZnSe, ZnTe, ZnO, HgS, HgSe, HgTe, MgSe, MgS, mixtures thereof, and/or the like; triad compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, mixtures thereof, and/or the like; and tetrad compounds, such as HgZnTeS, CdZnSeS, CdZnSeTe, CdZnSTe, CdHgSeS, CdHgSeTe, CdHgSTe, HgZnSeS, HgZnSeTe, HgZnSTe, mixtures thereof, and/or the like. However, the disclosure is not limited thereto.

The group III-V compound nanocrystals may include dyadic compounds, such as GaN, GaP, GaAs, GaSb, AlN, AlP, AlAs, AlSb, InN, InP, InAs, InSb, mixtures thereof, and/or the like; triad compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, mixtures thereof, and/or the like; or tetrad compounds, such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, mixtures thereof, and/or the like. However, the disclosure is not limited thereto.

The group IV-VI nanocrystals may include dyadic compounds, such as SnS, SnSe, SnTe, PbS, PbSe, PbTe, mixtures thereof, and/or the like; triad compounds, such as SnSeS, SnSeTe, SnSTe, PbSeS, PbSeTe, PbSTe, SnPbS, SnPbSe, SnPbTe, mixtures thereof, and/or the like; or tetrad compounds, such as SnPbSSe, SnPbSeTe, SnPbSTe, mixtures thereof, and/or the like. However, the disclosure is not limited thereto.

The form of the quantum dots may be a form used generally in the art, and is not particularly limited. However, examples of the form of the quantum dots may be, for example, spherical, pyramidal, multi-arm type or cubic type nanoparticles, a nanotube, a nanowire, a nano fiber, a nanoplate-like particle, and the like. As described above, the dyadic compounds, the triad compounds, or the tetrad compounds may be present in the particle at a uniform concentration, or may be present in the same particle by being divided into a state in which the concentration distribution may be partially different.

The quantum dots may have a core-shell structure, which may include a core including the above-described nanocrystals and a shell surrounding the core. The interface between the core and the shell may have a concentration gradient where the concentration of an element may be lowered as approaching the center of the element. The shell of the quantum dots may serve as a protective layer for preventing or reducing the chemical denaturation of the core to maintain semiconductor characteristics and/or a charging layer for imparting electrophoretic characteristics to the quantum dots. The shell may be a single layer or a multi-layer structure. As an example, a metal or non-metal oxide, a semiconductor compound, a combination thereof, and/or the like may be adopted as the shell of the quantum dots.

For example, the above-described metal or nonmetal oxide may include a dyadic compound, such as $SiO_2$, $Al_2O_3$, $TiO_2$, $ZnO$, $MnO$, $Mn_2O_3$, $Mn_3O_4$, $CuO$, $FeO$, $Fe_2O_3$, $Fe_3O_4$, $CoO$, $Co_3O_4$, $NiO$, and/or the like; or triad compounds, such as $MgA_2O_4$, $CoFe_2O_4$, $NiFe_2O_4$, $CoMn_2O_4$, and/or the like. However, the disclosure is not limited thereto.

The above-described semiconductor compound may include CdS, CdSe, CdTe, ZnS, ZnSe, ZnTe, GaAs, GaP, GaSb, HgS, HgSe, HgTe, InAs, InP, InSb, AlAs, AlP, AlSb, and/or the like. However, the disclosure is not limited thereto.

The light emitted by the first wavelength conversion particles QD1 may have a full width of half maximum (FWHM) of the light-emitting wavelength spectrum of about 45 nm or less, about 40 nm or less, or about 30 nm or less, thereby further improving the color purity and the color reproducibility. The light emitted by the first wavelength conversion particles QD1 may be emitted in various directions regardless of the incident angle of the incident light. Accordingly, the side visibility of the display device may be improved.

Some of the blue light provided from the first light emitting elements ED1_2 may not be converted into red light by the first wavelength conversion particles QD1. Light that is not converted by the first wavelength conversion member 451 but incident into the first color filter 431 may be blocked. Red light converted by the first wavelength conversion member 451 may be transmitted through the first color filter 431 and then emitted to the outside. Accordingly, light emitted to the outside from the first pixel PX1 may be red light.

The scattering particles SC may have a refractive index different from that of the base resin BS, and may form an optical interface with the base resin BS. The scattering particles SC are not particularly limited as the scattering particles SC may be made of a material capable of scattering at least some of the transmitted lights. For example, the scattering particles SC may be metal oxide particles or organic particles. Examples of the metal oxide may be titanium oxide ($TiO_2$), zirconium oxide ($ZrO_2$), aluminum oxide ($Al_2O_3$), indium oxide ($In_2O_3$), zinc oxide (ZnO), tin oxide ($SnO_2$), and the like. Examples of the organic material may be acryl-based resin, urethane-based resin, and the like. The scattering particles SC may scatter light in several directions regardless of the incident direction of incident light, without substantially converting the wavelength of the light transmitted through the first color conversion member 451. Accordingly, the path length of light transmitted through the first wavelength conversion member 451 may be increased, and the color conversion efficiency caused by the first wavelength conversion particles QD1 may be improved.

A second wavelength conversion member 452 may be located or disposed in the second pixel PX2, and may not be located or disposed in the first pixel PX1 and/or the third pixel PX3. The second wavelength conversion member 452 may convert the wavelength of incident light and emit the converted light. For example, the second wavelength conversion member 452 may convert the color of the incident light and emit the converted light. For example, the second wavelength conversion member 452 may convert blue light into green light and emit the green light.

The second wavelength conversion member 452 may include a base resin BS and second wavelength conversion particles QD2 scattered in the base resin BS, and may include scattering particles SC scattered in the base resin BS.

The base resin BS and the scattering particles SC, which may be included in the second wavelength conversion member 452, may be substantially identical to those of the first wavelength conversion member 451, and therefore, their detailed descriptions will be omitted.

Examples of the second wavelength conversion particles QD2 may be quantum dots, quantum rods, phosphors, and the like. A more detailed description of the second wavelength conversion particles QD2 may be substantially identical or similar to that of the first wavelength conversion particles QD1 in the first wavelength conversion member 451, and therefore, the detailed description will be omitted.

Blue light emitted from the second light emitting element ED2_2 may be provided to the second wavelength conversion member 452, and the second wavelength conversion particles QD2 may convert light provided from the second light emitting element ED2_2 into green light and emit the green light.

Some of the light provided from the second light emitting element ED2_2 may not be converted into greed light by the second wavelength conversion particles QD2, and may be blocked by the second color filter 432. Green light converted by the second wavelength conversion member 452 among lights provided from the second light emitting element ED2_2 may be transmitted through the second color filter 432 and then emitted to the outside. Accordingly, light emitted to the outside from the second pixel PX2 may be green light.

The light scattering member 453 may be located or disposed in the third pixel PX3, and may not be located or disposed in the first pixel PX1 and/or the second pixel PX2. The light scattering member 453 may allow incident light to be transmitted therethrough.

The light scattering member 453 may include a base resin BS and scattering particles SC scattered in the base resin BS.

The base resin BS and the scattering particles SC of the light scattering member 453 may be substantially identical to those of the above-described first and second wavelength conversion members 451 and 452, and therefore, their detailed descriptions will be omitted.

The scattering particles SC may scatter light in several directions regardless of the direction of incident light, without substantially converting the wavelength of the light transmitted through the light scattering member 453. Accordingly, the side visibility of light transmitted through the light scattering member 453 may be improved.

Blue light provided from the third light emitting element ED3_2 may be transmitted through the light scattering member 453 and the third color filter 433 and then emitted to the outside. For example, light emitted from the third pixel PX3 may have the same wavelength as that emitted from the third light emitting element ED3_2. In an embodiment, the third color filter 433 may be omitted. Therefore, the light emitted from the third light emitting element ED3_2 may be scattered by the light scattering member 453 and then emitted to the outside.

The first wavelength conversion member 451, the second wavelength conversion member 452, and the light scattering member 453 may have different areas, corresponding to the respective pixels PX1, PX2, and PX3. However, the disclosure is not limited thereto, and the first wavelength conversion member 451, the second wavelength conversion member 452, and the light scattering member 453 may have the same or similar area.

Heights or thicknesses of the first wavelength conversion member 451, the second wavelength conversion member 452, and the light scattering member 453 may be substantially equal to each other. However, the disclosure is not limited thereto, and the heights or thicknesses may be different from one another. Alternatively, the heights or thicknesses of two components among the components may be the same, but the height or thickness of the other component may be different from those of the other two components.

As described above, by the first wavelength conversion member 451, the second wavelength conversion member 452, and the light scattering member 453 of the color conversion layer 400_2, blue light transmitted through the first wavelength conversion member 451 may be converted into red light and then emitted to the outside, and blue light transmitted through the second wavelength conversion member 452 may be converted into green light and then emitted to the outside. For example, light incident into the color conversion layer 400_2 may be scattered by the scattering particles SC included in the first wavelength conversion member 451, the second wavelength conversion member 452, and the light scattering member 453 and then emitted to the outside.

Each of pixels PX1, PX2, and PX3 of the display device 1002 may emit light of different colors to the outside, and constitute one pixel unit PXU2.

As described above, light emitted to the outside by the display device 1002 may include lights emitted from the light emitting elements ED1_2, ED2_2, and ED3_2 and external light incident into the display device 1002 by the light condensing element 200, and the display luminance of the display device 1002 may be improved corresponding to external brightness, without increasing current consumption of the light emitting elements ED1_2, ED2_2, and ED3_2.

The display device 1002 may emit light having improved color reproducibility and side visibility to the outside, through the first wavelength conversion member 451, the second wavelength conversion member 452, and the light scattering member 453, which may be included in the color conversion layer 400_2.

Figure 9:
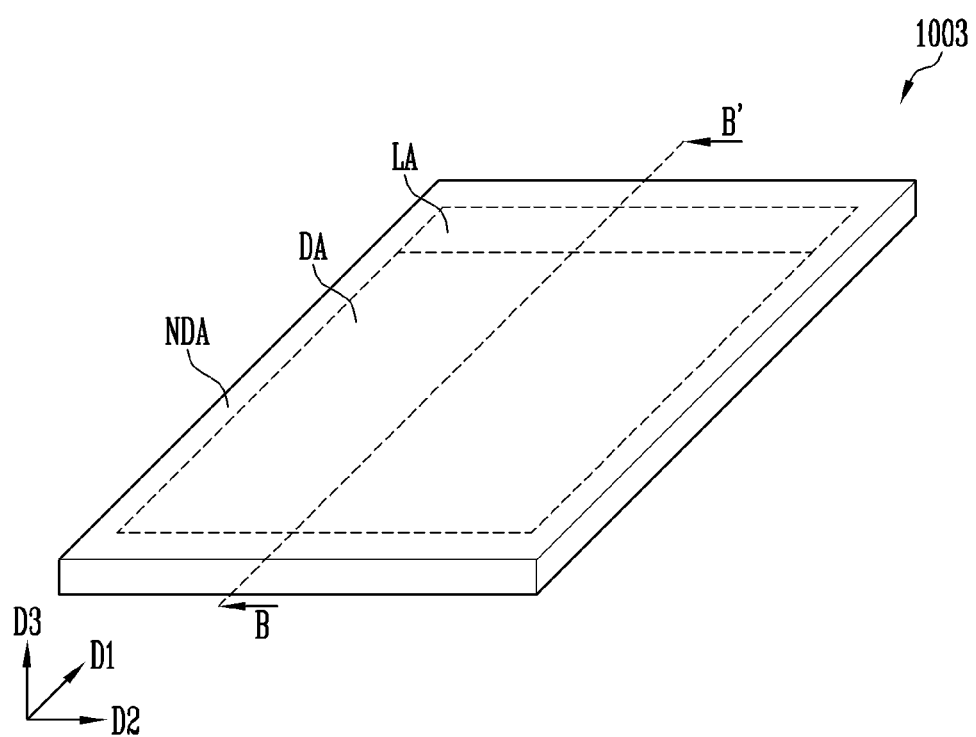
FIG. 9 is a schematic perspective view of a display device in accordance with an embodiment.
Figure 10:
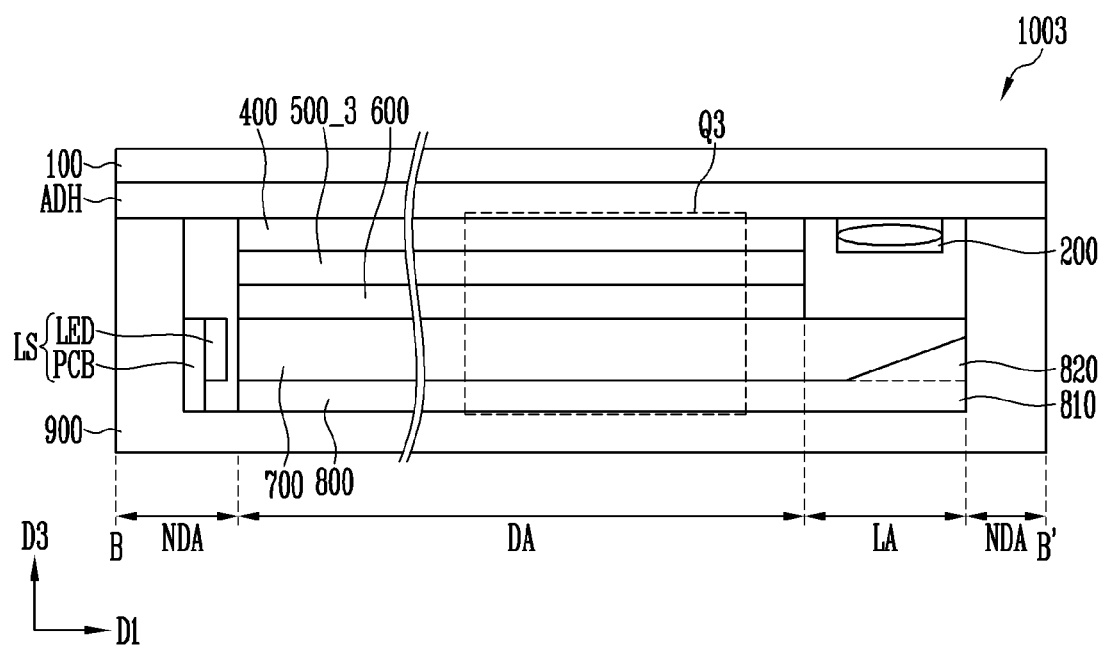
FIG. 10 is a schematic cross-sectional view taken along line B-B' shown in FIG. 9.
Figure 11:
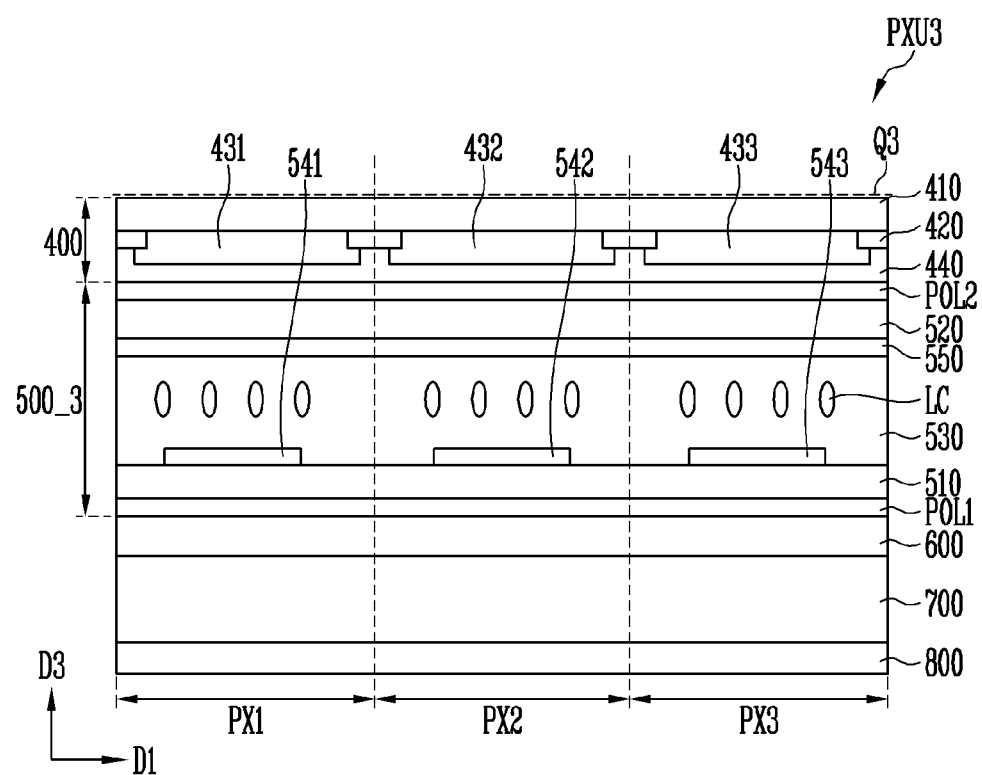
FIG. 11 is an enlarged schematic cross-sectional view of region Q3 shown in FIG. 10, which is a view illustrating a pixel unit in accordance with an embodiment.

FIG. 9 is a schematic perspective view of a display device in accordance with an embodiment. FIG. 10 is a schematic cross-sectional view taken along line B-B' shown in FIG. 9. FIG. 11 is an enlarged schematic cross-sectional view of region Q3 shown in FIG. 10, which is a view illustrating a pixel unit in accordance with an embodiment.

The embodiment shown in FIGS. 9 to 11 may be different from the embodiment shown in FIGS. 3 and 4 in that the first display panel 300 may be omitted, and a liquid crystal display panel 500_3 may be included. For example, an embodiment shown in FIGS. 9 to 11 may be different from the embodiment shown in FIGS. 3 and 4 in that the display device 1003 may not be an organic light emitting display device including organic light emitting elements but may be instead a liquid crystal display device including the liquid crystal display panel 500_3. Hereinafter, differences of the embodiment shown in FIGS. 9 to 11 from the embodiment shown in FIGS. 3 and 4 will be mainly described.

Referring to FIGS. 9 to 11, the display device 1003 may include the light condensing element 200, the color conversion layer 400, the liquid crystal display panel 500_3, the diffusion plate 600, the light guide plate 700, and the reflective plate 800. The display device 1003 may include a light source LS located or disposed adjacent to a side of the light guide plate 700.

The color conversion layer 400, the liquid crystal panel 5003, and the diffusion plate 600 may be located or disposed in the display region DA, the light condensing element 200 may be located or disposed in the light incident region LA, and the light guide plate 700 and the reflective plate 800 may be located or disposed to extend in the display region DA and the light incident region LA.

The light source LS located or disposed at a side of the light guide plate 700 may include a printed circuit board PCB and LED chips LED mounted on the printed circuit board PCB. The LED chips LED may emit light in the direction (for example, the first direction D1) of the light guide plate 700, and the light emitted from the LED chips LED may be white light. However, the disclosure is not limited thereto.

The light emitted from the LED chips LED may be incident into the light guide plate 700. For example, external light incident into the display device 1003 through the light condensing element 200 of the light incident region LA may also be incident into the light guide plate 700. The lights incident into the light guide plate 700 may be uniformly scattered by the light guide plate 700 and the diffusion plate 600, to advance toward the liquid crystal display panel 500_3.

The liquid crystal display panel 500_3 may include the first liquid crystal substrate 510, the second liquid crystal substrate 520, the liquid crystal layer 530, first to third liquid crystal pixel electrodes 541, 542, and 543, a liquid crystal common electrode 550, and the polarizing plates POL1 and POL2. An electric field may be formed or generated in the liquid crystal layer 530 according to operations of the first to third liquid crystal pixel electrodes 541, 542, and 543 and the liquid crystal common electrode 550, so that the liquid crystals LC may be rotated. Accordingly, the light transmittance of the liquid crystal display panel 500_3 may be changed, and the liquid crystal display panel 500_3 may allow light to be selectively transmitted therethrough.

The lights transmitted through the liquid crystal display panel 500_3 may be incident into the color conversion layer 400, and may have a color converted by the color conversion layer 400 and then emitted to the outside. In an embodiment, the lights transmitted through the liquid crystal display panel 500_3 may be white lights. White light transmitted through the first color filter 431 may be converted into red light and then emitted to the outside. White light transmitted through the second color filter 432 may be converted into green light and then emitted to the outside. White light transmitted through the third color filter 433 may be converted into blue light and then emitted to the outside.

Accordingly, each of pixels PX1, PX2, and PX3 of the display device 1003 may emit lights of different colors to the outside, and constitute one pixel unit PXU3.

In an embodiment, when the lights transmitted through the liquid crystal display panel 500_3 are blue lights, the color conversion layer 400 may include the wavelength conversion member as illustrated in FIGS. 7 and 8.

As described above, in order to provide light to the liquid crystal display panel 5003, the display device 1003 may include the light source LS located or disposed at a side of the light guide plate 700, and may include the light condensing element 200 that condenses external light toward the light guide plate 700. Thus, the display luminance of the display device 1003 may be improved corresponding to external brightness, without increasing current consumption of the LED chips.

Figure 12A:
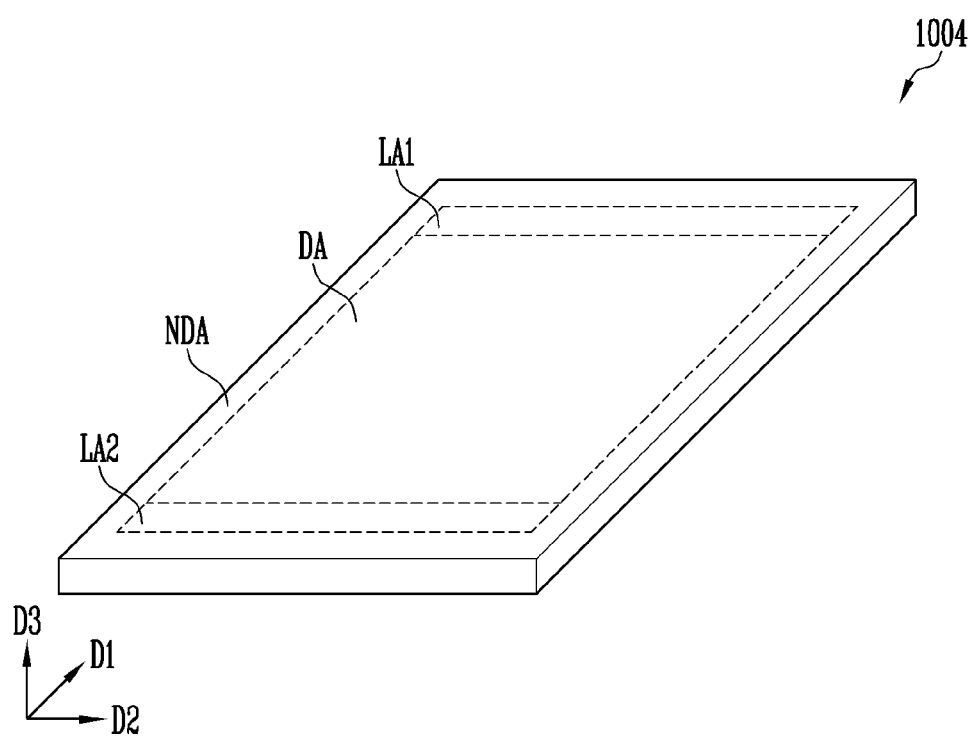
FIGS. 12A and 12B are schematic perspective views of display devices in accordance with embodiments.
Figure 12B:
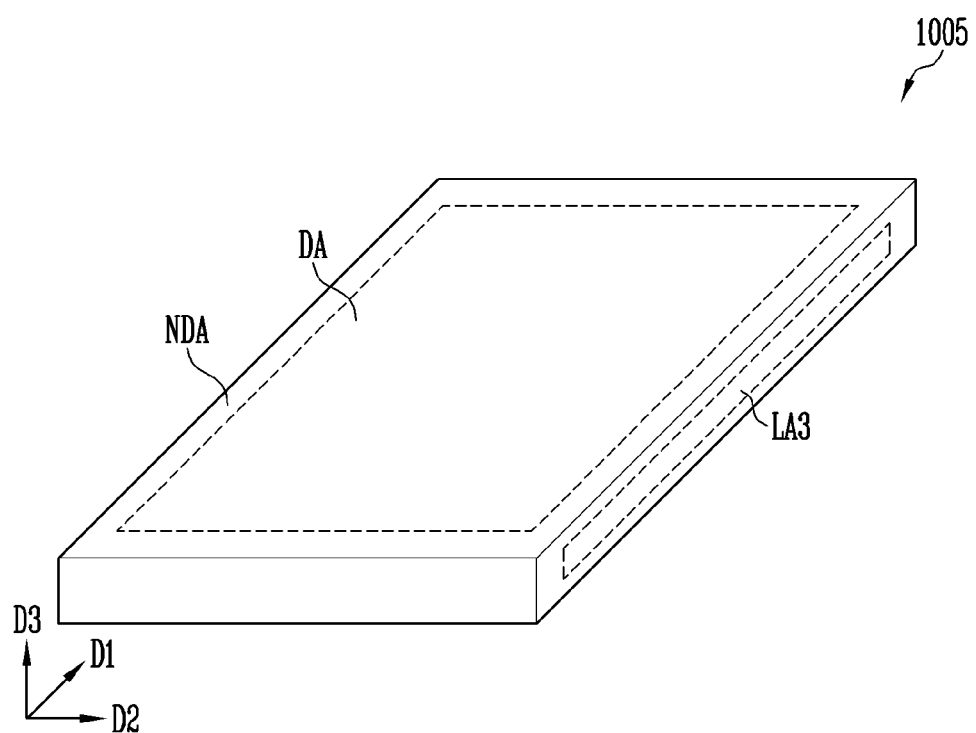

FIGS. 12A and 12B are schematic perspective views of display devices in accordance with embodiments. Structures illustrated in FIGS. 12A and 12B represent that the number and positions of light incident regions LA may be diverse or varied, as compared with the structure illustrated in FIGS. 1 and 3.

Further referring to FIG. 12A in conjunction with FIGS. 1 and 3, a display device 1004 may include first and second light incident regions LA1 and LA2. The first and second light incident regions LA1 and LA2 may be located or disposed adjacent to short sides of the display region DA. For example, the first light incident region LA1 may be located or disposed adjacent to a short side of the display region DA in the first direction D1, and the second light incident region LA2 may be located or disposed adjacent to another side of the display region DA in the first direction D1.

The light condensing element (200 shown in FIG. 3) may be located or disposed in each of the first and second light incident regions LA1 and LA2, and external lights may be incident into the display device 1004 through the light condensing elements of the first and second light incident regions LA1 and LA2. For example, a first light condensing element may be located or disposed in the first light incident region LA1, and a second light condensing element may be located or disposed in the second light incident region LA2, so that external light may be transmitted to the light guide plate 700.

As shown in FIG. 12A, when the display device 1004 includes light incident regions LA1 and LA2, external light may be more effectively incident into the display device 1004, as compared with the display device 1000 illustrated in FIG. 1. For example, the display luminance of the display device 1004 may be further improved corresponding to external brightness.

Although FIG. 12A illustrates a structure in which the first and second light incident regions LA1 and LA2 may be located or disposed adjacent to both the short sides of the display region DA, the disclosure is not limited thereto, and the first and second light incident regions LA1 and LA2 may be located or disposed adjacent to both long sides of the display region DA.

Referring to FIG. 12B in conjunction with FIGS. 1 and 3, a display device 1005 may include a third light incident region LA3 located or disposed on a different plane from that of the display region DA. For example, the third light incident region LA3 may be located or disposed on a side surface of the display device 1005. In an embodiment, the third light incident region LA3 may be located or disposed to extend along the first direction D1 on a side surface of the display device 1005 in the second direction D2, but the disclosure is not limited thereto. In an embodiment, the third light incident region LA3 may be located or disposed to extend along the second direction D2 on a side surface of the display device 1005 in the first direction D1.

In the embodiment shown in FIG. 12B, the light condensing element (200 shown in FIG. 3) may be located or disposed in the third light incident region LA3 of the display device 1005, and may allow light to be incident into one end portion of the light guide plate (700 shown in FIG. 3) located or disposed in the display device 105. For example, in the embodiment shown in FIG. 12B, the reflective plate (800 shown in FIG. 3) of the display device 1005 may not include the protrusion part (820 shown in FIG. 3).

When a user uses the display device 1005 in a state in which the display device may be erected (for example, when the user uses the display device 1005 such that a display surface of the display device 1005 may be perpendicular to the surface of the earth), a surface into which external light (for example, sunlight) may be frequently incident may be a side surface of the display device 1005. For example, when the third light incident region LA3 is formed on a side surface of the display device 1005 in the above-described usage environment, external light may be effectively incident into the display device 1005.

In accordance with the disclosure, external light may be incident into the display device through the light condensing element located or disposed in the light incident region adjacent to the display region, and the incident external light may be emitted to the outside through the light guide plate and the liquid crystal display panel. Accordingly, there may be provided a display device capable of increasing display luminance without increasing current consumption.

Example embodiments have been disclosed herein, and although specific terms may be employed, those terms are to be interpreted in a generic and descriptive sense only and not for purpose of limitation. In some instances, as would be apparent to one of ordinary skill in the art as of the filing of the application, features, characteristics, and/or elements described in connection with an embodiment may be used singularly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
    a first display panel including a light emitting element;
    a light condensing element disposed at a side portion of the first display panel;
    a light guide plate disposed below the first display panel; and
    a reflective plate including a protrusion part having an inclined surface, and the reflective plate including a flat part,
    wherein the light condensing element transmits external light to the light guide plate by the inclined surface of the protrusion part, the flat part of the reflective plate reflects external incident light advancing toward a display region through the light guide plate, and the external light is emitted upward.

2. The display device of claim 1, further comprising a second display panel disposed between the first display panel and the light guide plate, the second display panel including a liquid crystal layer.

3. The display device of claim 1, further comprising a diffusion plate disposed between a second display panel and the light guide plate.

4. The display device of claim 1, wherein the reflective plate is disposed below the light guide plate, and includes a metal layer.

5. The display device of claim 4, wherein
    the first display panel includes a data line electrically connected to the light emitting element,
    a data signal is applied to the data line to drive the light emitting element of the first display panel, and
    light transmittance of a second display panel is changed by the light emitting element.

6. The display device of claim 4, wherein
    the protrusion part extends from the flat part, and
    the protrusion part is disposed to overlap the light condensing element.

7. The display device of claim 6, wherein the protrusion part receives the external light transmitted from the light condensing element, and reflects the external light toward the light guide plate.

8. The display device of claim 7, wherein the flat part and the protrusion part are integrally formed.

9. The display device of claim 7, wherein the light guide plate includes an inclined surface formed between a lower surface of the light guide plate and a side surface of the light guide plate,
    wherein the inclined surface of the light guide plate corresponds to the protrusion part extending from the flat part of the reflective plate.

10. The display device of claim 1, further comprising a color conversion layer disposed to overlap the first display panel and a second display panel,
    wherein the color conversion layer includes a color filter.

11. The display device of claim 10, wherein the color conversion layer is disposed between the first display panel and the second display panel.

12. The display device of claim 11, wherein the first display panel includes at least one of a red light emitting element emitting red light, a green light emitting element emitting green light, and a blue light emitting element emitting blue light.

13. The display device of claim 10, wherein the color conversion layer is disposed above the first display panel.

14. The display device of claim 13, wherein the first display panel includes at least one of a red light emitting element emitting red light, a green light emitting element emitting green light, a blue light emitting element emitting blue light, and a white light emitting element emitting white light.

15. The display device of claim 13, wherein
    the color conversion layer further includes a wavelength conversion member disposed between the first display panel and the color filter, and
    the wavelength conversion member includes quantum dots and scattering particles.

16. The display device of claim 15, wherein the first display panel includes a blue light emitting element emitting blue light.

17. A display device comprising:
    a display panel;
    a light condensing element disposed at a side portion of the display panel;
    a light guide plate disposed below the display panel;
    a reflective plate including a protrusion part having an inclined surface, the reflective plate including a flat part; and
    a light source disposed adjacent to a side of the light guide plate,
    wherein the light condensing element transmits external light to the light guide plate by the inclined surface of the protrusion part, and
    the flat part of the reflective plate reflects external incident light advancing toward a display region through the light guide plate, and the external light is emitted upward.

18. The display device of claim 17, wherein the display panel is a liquid crystal display panel including a liquid crystal layer.

19. The display device of claim 17, wherein the reflective plate is disposed below the light guide plate.

20. The display device of claim 19, further comprising a color conversion layer disposed above the liquid crystal display panel, wherein the color conversion layer includes a color filter.

* * * * *